United States Patent [19]

Holland et al.

[11] 4,151,642
[45] May 1, 1979

[54] DEVICE FOR PRE-SETTING TOOLS FOR NUMERICAL CONTROLLED MACHINE

[75] Inventors: Charles L. Holland, Escondido; Steven S. Hardy, San Diego, both of Calif.

[73] Assignee: General Dynamics Corporation, San Diego, Calif.

[21] Appl. No.: 849,724

[22] Filed: Nov. 9, 1977

Related U.S. Application Data

[62] Division of Ser. No. 729,517, Oct. 4, 1976, Pat. No. 4,117,943.

[51] Int. Cl.² ............... B23B 25/06; B27G 23/00
[52] U.S. Cl. ............................... 29/705; 33/185 R
[58] Field of Search .................. 29/705, 240, 57; 33/185; 81/57, 52.4

[56] References Cited

U.S. PATENT DOCUMENTS

| | | |
|---|---|---|
| 3,758,938 | 9/1973 | Simmons et al. .............. 29/240 X |
| 3,781,999 | 1/1974 | Colangelo ...................... 33/185 R |
| 3,838,521 | 10/1974 | Peterson ........................ 33/185 R |

Primary Examiner—Milton S. Mehr
Attorney, Agent, or Firm—John R. Duncan

[57] ABSTRACT

A device to code a machine tool holder, to preset the tool length, to mount the tool in the holder, and to inspect tool dimensions and coding. These functions are performed by a ring selector which selects different outside diameter rings in such sequence that a desired indentification of a tool by a combination of lands and grooves is accomplished, by a power torque machine which tightens the tool holder collet, by a digital height and diameter gage device which inspects the tool dimensions, and by a digital ring counter which gives a digital readout of the land and groove combination on the external surface of a tool holder.

3 Claims, 16 Drawing Figures

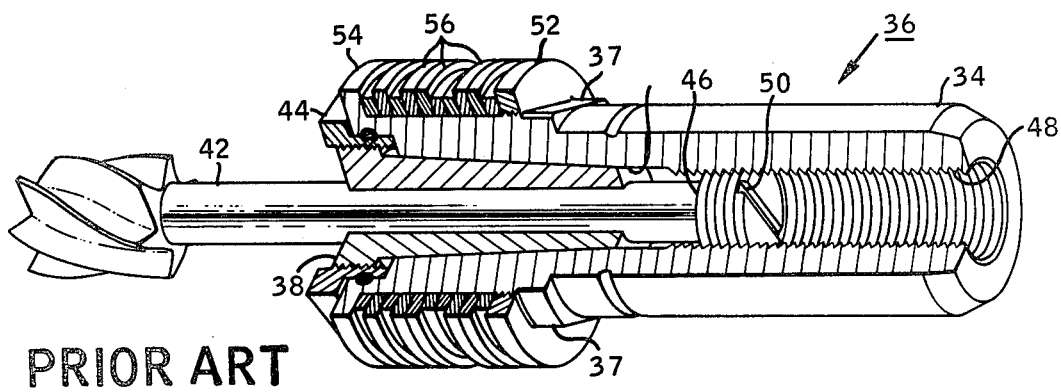
PRIOR ART
FIG. 2
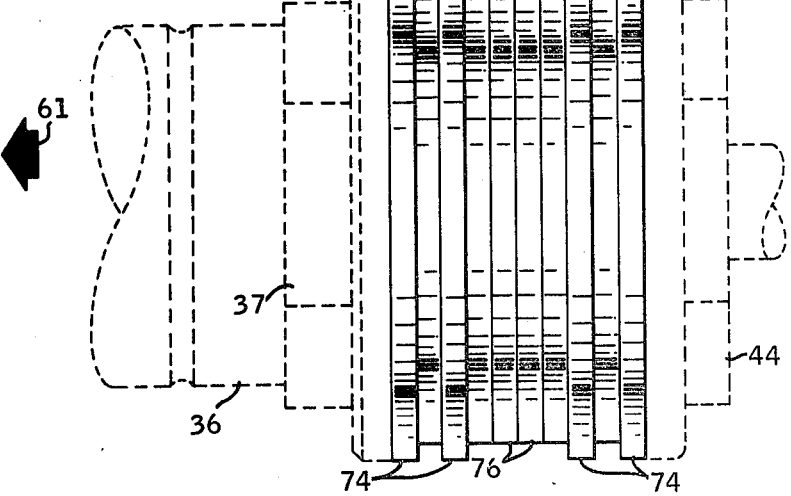
PRIOR ART
FIG. 3a
PRIOR ART
FIG. 3b

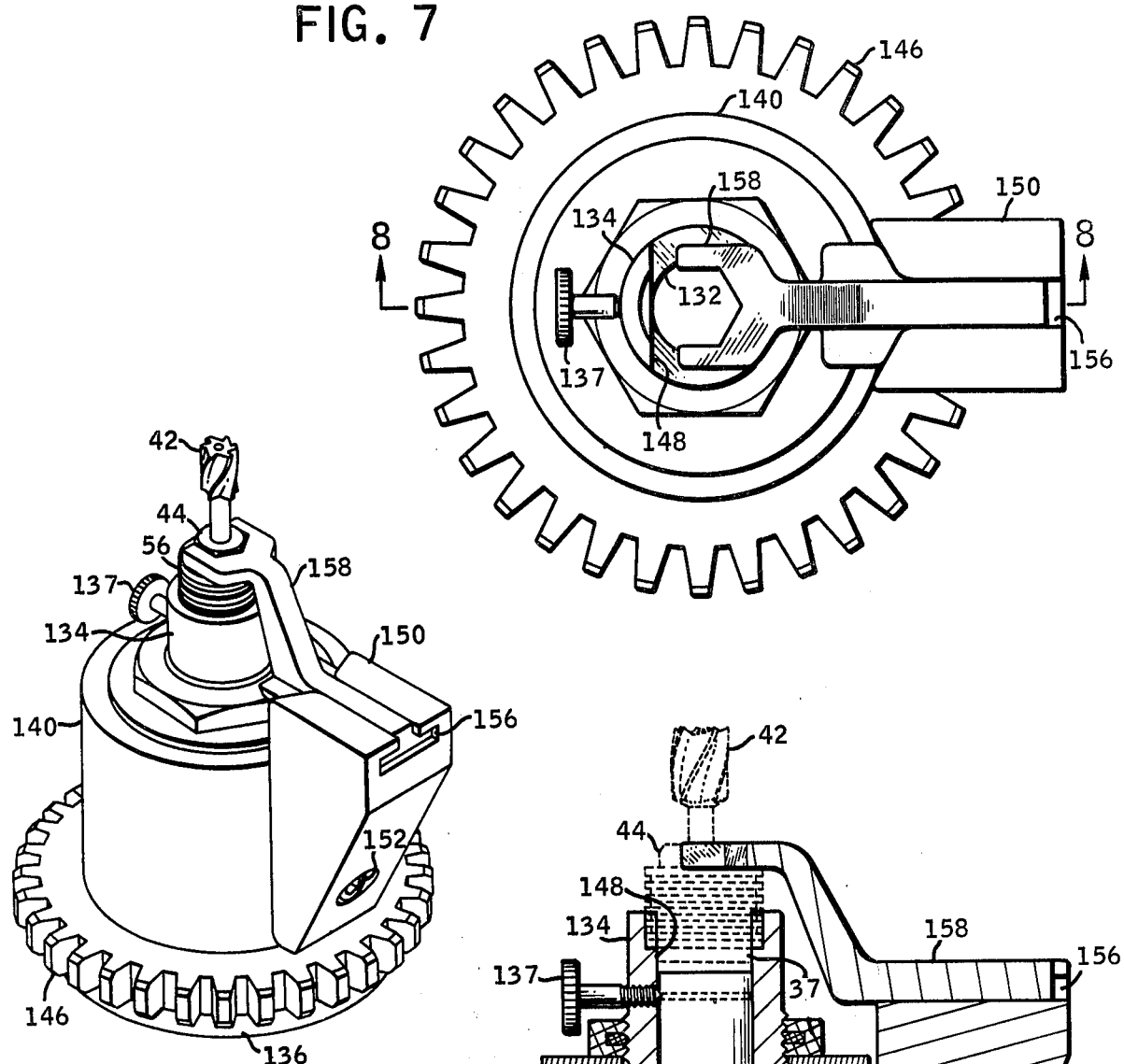
FIG. 7
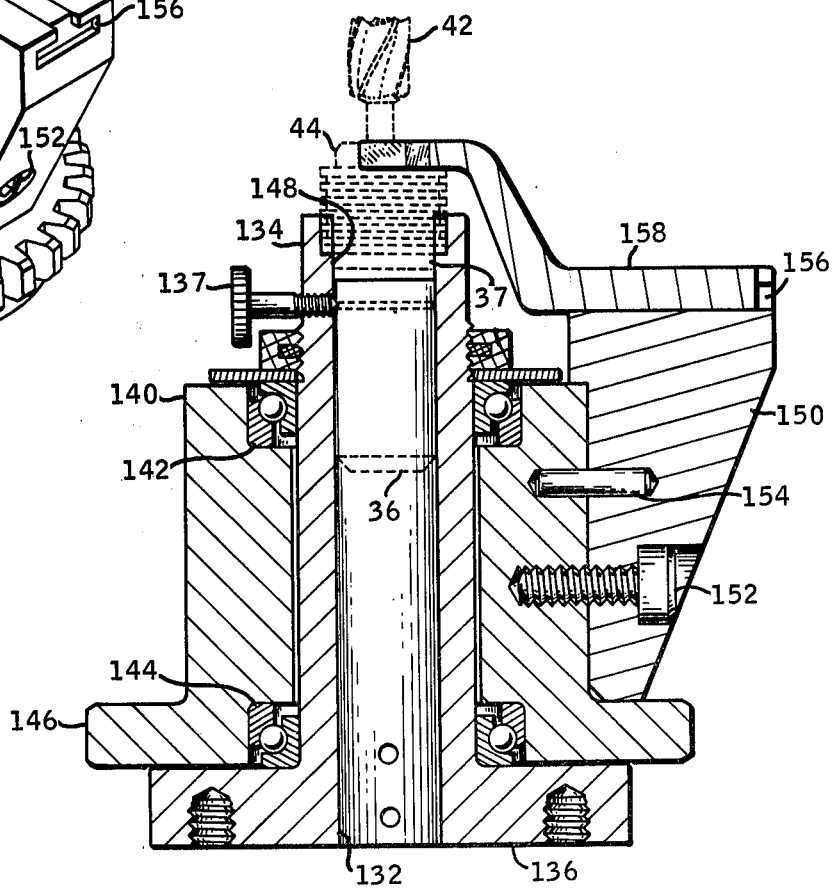
FIG. 6
FIG. 8

DEVICE FOR PRE-SETTING TOOLS FOR NUMERICAL CONTROLLED MACHINE

This application is a division of our U.S. Patent application Ser. No. 729,517, filed Oct. 4, 1976, now U.S. Pat. No. 4,117,943.

BACKGROUND OF THE INVENTION

Automatic numerical controlled machines are used to perform a variety of machining operations, such as milling, boring, drilling, reaming, honing, and threading. For each such operation, the exact location, the amount of material to be removed, the finished dimension, and the diameter and depth of holes to be machined, are predetermined and translated into a numerical code which is stored on magnetic tape, perforated tape, cards or the like. The machine is thus "numerically controlled" to perform many machining operations automatically without the requirement for human operators in constant attendance. Such a sequence of operations normally requires the use of a variety of tools, and so the selection of the specific tool needed for each operation and its insertion in the machine spindle is accomplished by numeric control of an automatic tool changer. The automatic tool changer selects a specific tool from a plurality of different types and sizes of tools in a storage magazine and transfers the selected tool to the spindle of the machine while simultaneously removing the previously used tool from the spindle and depositing it in the storage magazine in the position from which the newly selected tool was removed. Such a tool changing operation requires significantly less time to effect a tool change than a system which removes a tool from the spindle and searches for the position in the storage magazine from which the tool was removed and then searches the magazine for the next tool and subsequently inserts the tool in the spindle. This latter operation employs "position coding" of the magazine, whereas the instant operation employs "tool coding" which allows an old tool to be placed in the storage position from which the new tool has just been removed. It is conceivable that after a number of machine sequential operations a specific tool may have occupied every position in the tool storage magazine, without ever having impaired the machine's ability to find that tool when it is next needed.

One of the tool coding techniques currently in use employs a plurality of axially spaced lands and grooves, which may be binary coded, on each of the tool holders for facilitating the selection of a particular tool from a plurality of different types and sizes of tools. The lands and grooves are provided by a plurality of rings which are slipped over the outside diameter of the tool holder. Usually two sizes of rings are utilized, each having the same inside diameter to slidably fit the tool holder, each having the same thickness, and differing only in outside diameter, the smaller diameter ring serving as the groove, and the larger diameter ring serving as the land. These lands and grooves function as the two numerals "0" and "1" in the binary numbering system. Various combinations of grooves and lands produce binary numbers 1, 2, 4, 8 and 16 depending on their relative position along the tool holder and, therefore, require the shop man to be familiar with the binary numbering system or to use a code card to compare against the tool in order to know the cumulative value of the binary digits comprising the coded number. This has been the cause for confusion and error among machine shop personnel, both in setting up such tools and in subsequent indentification of the tool in usage. Additionally, there has been some difficulty experienced by personnel in the mounting of tools in their tool holders to the precise dimensional requirements of a fully automated numerical control system.

SUMMARY OF THE INVENTION

It is therefore an object of this invention to provide a device and method for coding and identifying machine tools which overcome the above noted problems.

A further object of this invention is to precisely locate the cutting tool within the tool holder and torque the tool holder collet to the prescribed preload while maintaining the free tool length.

Another object is to provide a system for automatically selecting, installing and inspecting tool holders having binary coding rings of improved accuracy.

The above objects, and others, are accomplished in accordance with this invention by a three-station arrangement for selecting, installing and inspecting tool holder coding rings. At the first station, binary coding rings having two different diameters (representing binary 0 and 1) are automatically selected and stacked in response to a numerical keyboard input to produce the desired binary total. At the second station, the rings are installed on a tool holder, the tool holder collet is tightened and the tool dimensions are measured and verified as within the selected tolerances. At the third station, a digital ring counter automatically inspects the ring and land configuration and produces a digital readout which can be verified against the number used in selecting the rings originally.

BRIEF DESCRIPTION OF THE DRAWING

Details of the invention, and a preferred embodiment thereof, are further described in the drawing, wherein:

FIG. 2 is a perspective view, partially cut away showing a typical prior art tool holder useful with the system of this invention;

FIG. 3(a) is a representation of a binary coding chart for selecting coding rings;

FIG. 3(b) is schematic representation illustrating the coding of a typical tool holder;

FIG. 6 is a perspective view, showing the tool holder torquing station;

FIG. 7 is a plan view of the tool holder torquing device;

FIG. 8 is a vertical section through the torquing device, taken on line 8—8 in FIG. 7;

DETAILED DESCRIPTION OF THE INVENTION

Figure 1:
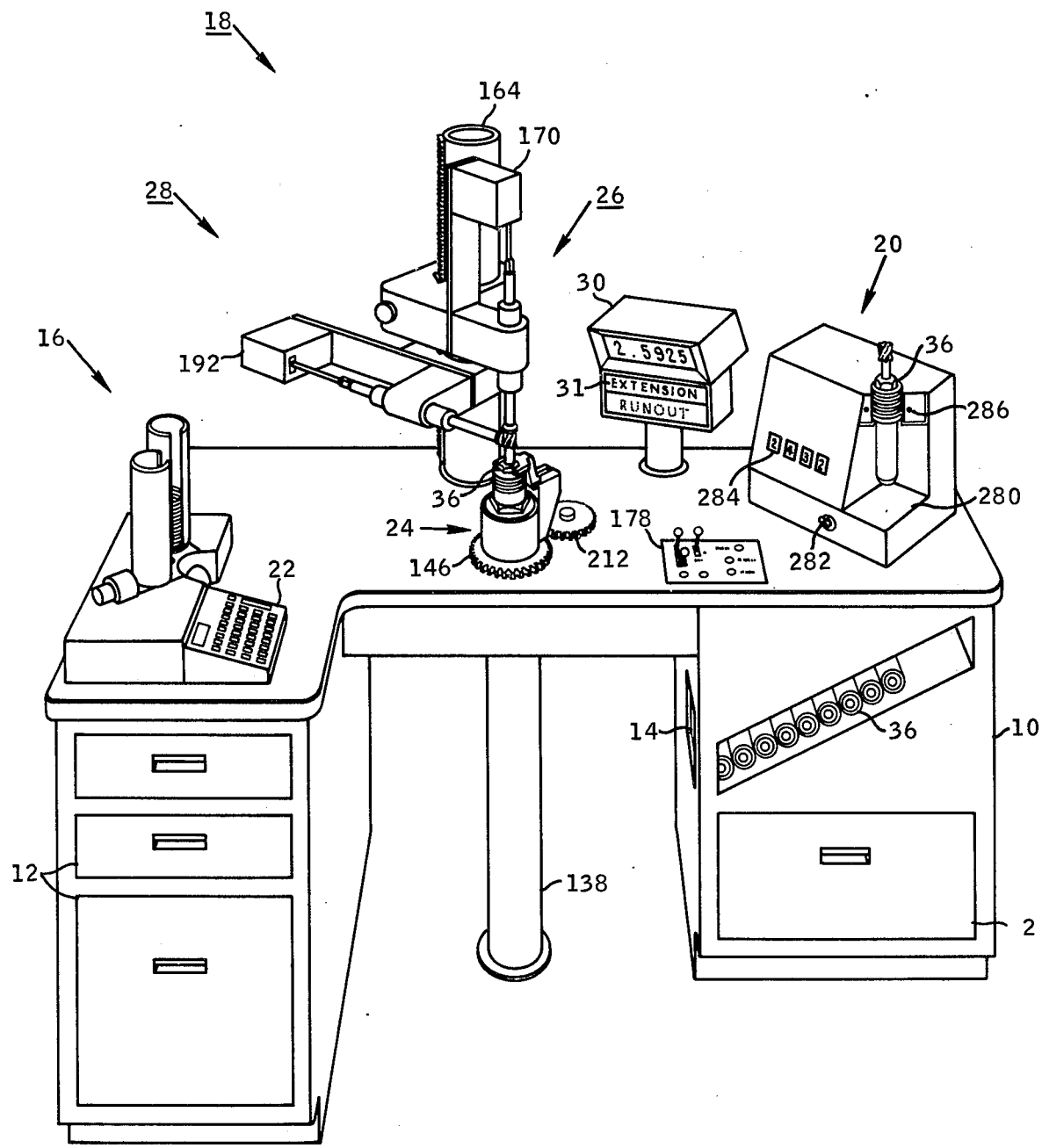
FIG. 1 is a perspective view of the overall assembly comprising three sequential operating stations.

Referring now to FIG. 1, there is seen an overall perspective view of the device for pre-setting tools to be used in numerical controlled machines. The components of the system are installed on a convenient work surface, such as desk-like support 10. Desk 10 may typically include drawers 12 in which parts, adjusting tools, etc. may be conveniently stored. A sloping rack 14 may be provided for storage of tool holders awaiting use.

Three sequential work stations are located on the surface of desk 10. From left to right as seen in FIG. 1, there are coding ring selector assembly 16, tool installing and dimensional measuring assembly 18 and digital ring counter assembly 20.

As detailed below, the desired digital tool code is entered at keyboard 22, causing selection of different diameter rings in the required order by ring selector 16. The resulting ring stack is installed on a conventional tool holder (typically of the type illustrated in FIG. 2). A tool is inserted, or may previously been inserted, in the tool holder. The tool holder is placed in the torquing device 24 of the installation and measuring station, the tool holder collet is tightened and vertical probe 26 and horizontal probe 28 measure tool dimensions, which are displayed on display 30.

The tool holder is then moved to the digital ring counter 20 where the number corresponding to the binary ring code produced by the pattern of rings on the tool holder is displayed. If the rings were correctly selected, the number displayed by counter 20 will be the same as that entered on keyboard 22 to start the sequence of operations.

Thus, tools for numerical controlled machines can be rapidly and accurately assembled and checked for correct coding and tool dimensions.

In order to fully comprehend the operation of this system, the configuration of a typical tool holder useful with this device should be made clear. Such a prior-art tool holder is shown, partially cut-away, in FIG. 2.

The main body 34 of tool holder 36 has a generally cylindrical exterior configuration adapted to fit conventional numerically controlled machines, such as milling machines. A pair of opposed flats 37 on tool holder 36 permit it to be secured against rotation, as detailed below. A tapered collet 38 fits into a correspondingly tapered base 40 within main body 34. A selected machining tool 42, typically a milling tool, fits within collet 38 and is retained in place when hexagonal nut 44 is tightened, driving collet 38 into bore 40. At the inner end of tool 42 a plug 46 threaded into internal threads 48 abuts tool 42. A slot 50 in the end of plug 46 permits adjustment of the extension of tool 42 by moving plug 46 thereagainst with a screwdriver prior to tightening nut 44.

A threaded securing ring 52 and flange 54 are located on main body 34 in a spaced relationship. A stack of coding rings 56 having two outside diameters are arranged in a selected sequence between securing ring 52 and flange 54, and are held in place by ring 52. The selected indentification of rings 56 can be read by sensors in the numerical control machine so that selection of the required tool according to a binary code is accomplished. While a specific tool is illustrated in FIG. 2, any other tool using rings of two different diameters for binary coding can be used with our pre-setting device.

A typical binary coding arrangement is illustrated in FIGS. 3(a) and 3(b). The chart 58 shown in FIG. 3(a) includes coding for a group of tools and for a specific tool within a group. The number down the sides of the charts, which correspond to key numbers on keyboard 22, are each the sum of the binary numbers shown by rings in the positions illustrated by dots 59. Spacers occupy positions without dots. In order to code a tool holder, one might select group 5 and tool 20, as shown by arrows 61. The use of this chart is illustrated in FIG. 3(b) in which chart 58 has been cut off just below the selected Group 5, Tool 20, locations. When the chart is placed against tool holder 36, it is seen that rings 74 correspond to chart positions containing dots 59, while spacers 76 correspond to chart positions without dots. The binary summing of the ring portions to provide chart and keyboard numbers is schematically illustrated just below tool holder 36.

Clearly mistakes are possible when a machine operator must determine ring and spacer positions from two different locations on a chart such as that shown in FIG. 3(a), then manually select and stack the rings and spacers on a tool holder. Checking ring and spacer location is difficult, since in practice the operator must refer back to the full chart and cannot cut it off for use as a gage as we have done for schematic illustration purposes in FIG. 3(b).

Figure 4:
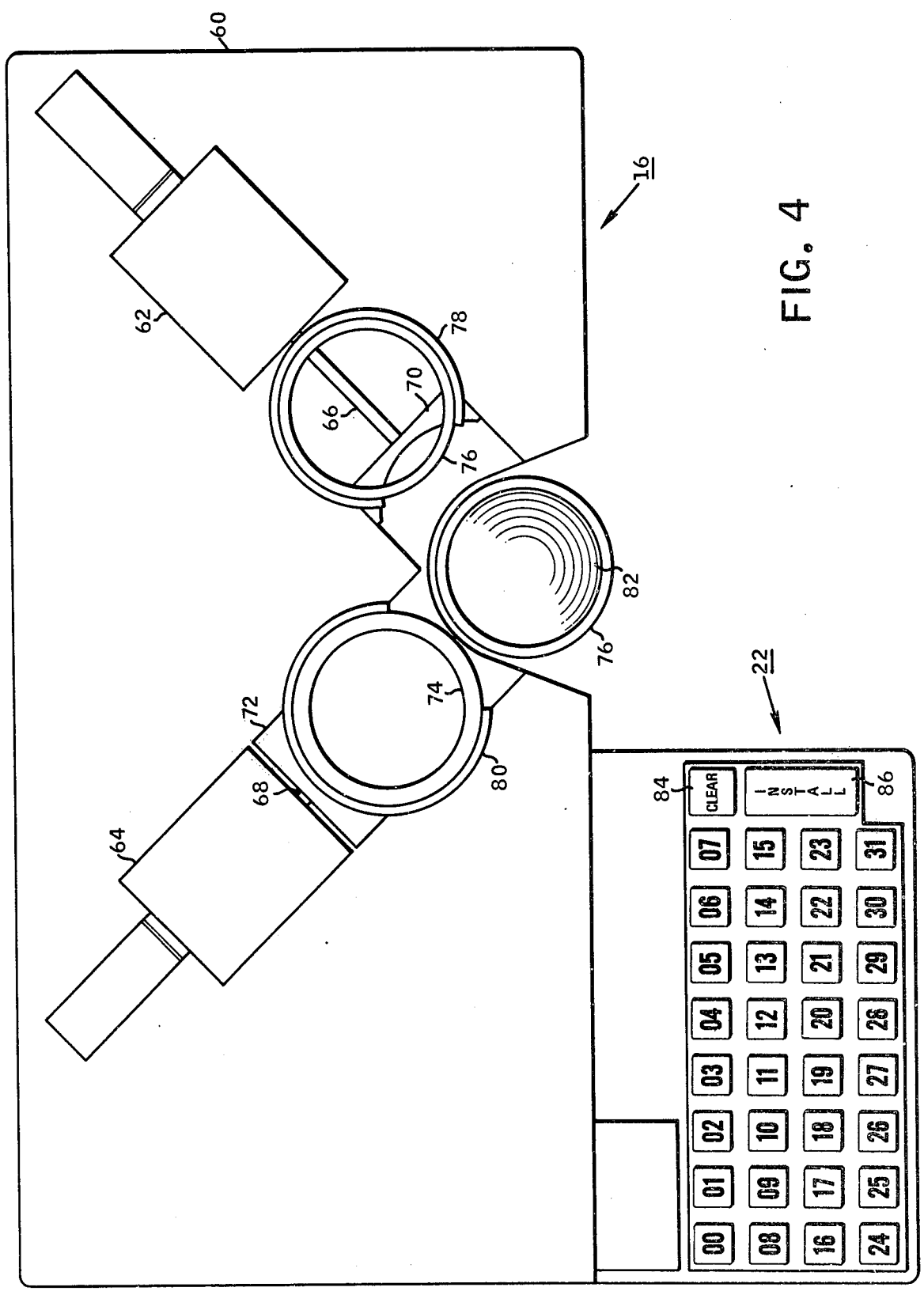
FIG. 4 is a plan view of the coding ring selector station.

A plan view of ring selector 16 is shown in FIG. 4. Selector 16 includes an elevated mounting panel 60 within which the electronic components shown in FIG. 5 may be contained. Two axial drive means 62 and 64 are mounted on panel 60 with their axially movable shafts 66 and 68, respectively, lying just above the plane of panel 60. Drive means 62 and 64 may typically be electrical solenoids or hydraulic cylinders capable of moving shafts 66 and 68 rapidly between extended (as shown with shaft 66) and retracted (as shown by shaft 68) positions. Pushers 70 and 72, having a circular front surface resembling a shuffleboard cue, are secured to the ends of shafts 66 and 68, respectively. Stacks of rings 74 and spacers 76 are positioned within housings 78 and 80 adjacent to the retracted positions of pushers 70 and 72, respectively. While all of rings 74 and spacers 76 have the same inside diameter, rings 74 have a uniform larger outside diameter than the uniform smaller outside diameter of spacers 76.

When one of drive means 62 and 64 is actuated, shaft 66 or 68 is extending, pushing the bottom most ring out from under the corresponding stack. As the ring is propelled over the edge of panel 60, it falls onto an upstanding elliptical or conical member 82. Thus, when drive means 62 and 64 are pulsed in a selective sequence, a stack of rings having the selected pattern of outside diameters will be placed on upstanding member 82. As seen in FIG. 3, pusher 70 has just deposited a spacer 76 on member 82 and is retracting.

In order to produce a ring stack on member 82 having the proper binary coded indentification, the operator depresses keys on keyboard 22 in the proper order. An error may be retracted by pressing "clear" key 84. When the proper key sequence has been entered, the "install" key 86 is depressed. Drive means 62 and 64 are then electronically pulsed in the proper sequence to produce the desired ring stack.

A typical electronic circuit capable of pulsing drive means 62 and 64 in a sequence corresponding to a number entered on keyboard 22 is schematically illustrated in FIG. 4.

Each of the keys in keyboard 22 actuates a correspondingly numbered switch 90 which includes an electromagnetic means 92 for holding an operated key switch closed until cleared. If an error is made, pressing the "clear" key 84 operates normally closed clear switch 94, actuating clear relay 96, releasing all holding means 92.

Once the selected keys have all been pressed, the "install" key 86 is pressed, closing install switch 98, starting stepping motor 100. As ring selector switch 102 and spacer selector switch 104 are stepped around counter-clockwise together, the moving contact closes circuits at positions 1-8 sequentially. The first 5 contacts on switches 102 and 104 correspond to binary 1, 2, 4, 8 and 16 as shown on the chart in FIG. 3(a). Thus, if Group 5 has been selected on keyboard 22, the desired pattern will be ring, spacer ring, spacer, spacer. When ring selector switch reaches the first contact 106, the circuit is closed through switch "05" to ring install relay 108 which actuates the ring installing drive means 64 (which may be a solenoid) to push a ring 74 onto member 82. Spacer install relay 110 is not actuated, since the circuit between it and the first contact of spacer selector switch 104 was broken when normally closed switch 112 was opened when switch "05" was closed by pressing key "05".

Stepping motor 100 then steps switches 102 and 104 to the second contact. Since the circuit between contact 116 of ring selector switch 102 and the ring install relay 108 is not completed by closing switch "05", a ring is not selected. On the other hand, since closing switch "05" does not open normally closed switch 114, a circuit is complete from contact 118 of spacer selector switch to spacer install relay 110. This actuates a solenoid or other drive means 62 to push a spacer 76 onto member 82 (as seen in FIG. 4).

In a similar manner, the switches 102 and 104 are stepped through the remaining contacts. The first five contacts operate the ring or spacer selection relays, while the sixth contact on switches 102 and 104 is not used. A "clear signal" switch 120 is coupled to switches 102 and 104 for rotation therewith. When switch 120 reaches contact 122, "clear" relay 96 is actuated, clearing the keyboard and stopping stepping motor 100, by opening "install" switch 98 through release of holding means 124. A plurality of transistor diodes 126 are provided in circuits leading away from switches 102 and 104 to prevent signal path reversal.

After installation of the "Group" rings and spacers, the "Tool" rings and spacers are similarly installed. To produce the pattern shown in FIG. 3(b) key 20 on keyboard 22 would be pressed, closing switch 20 shown in FIG. 5. This will open and close the appropriate switches to provide the required spacer, spacer, ring, spacer, ring pattern.

Figure 5:
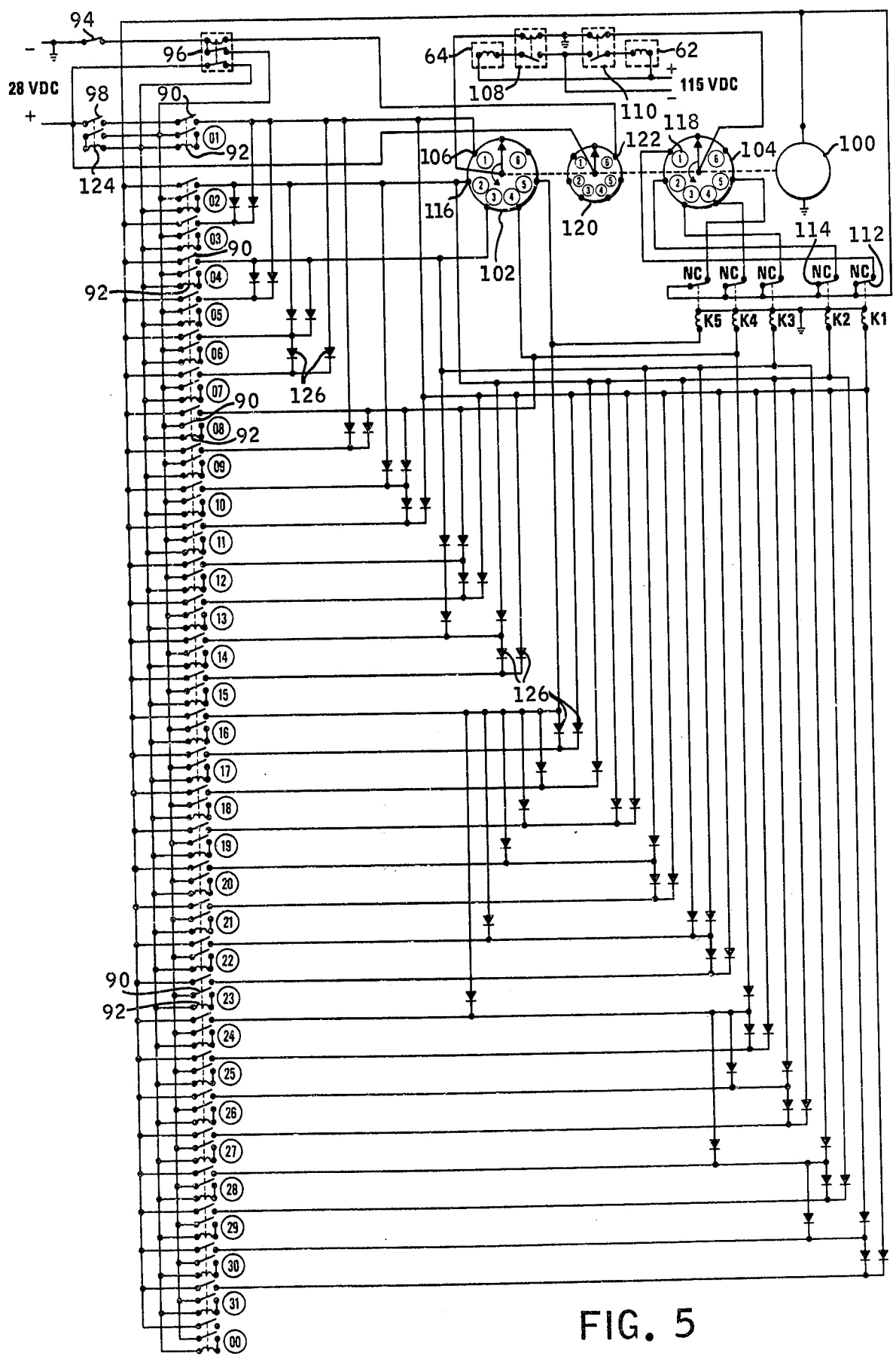
FIG. 5 is an electrical schematic diagram of the circuit used in ring selection.

Thus it can be seen that the ring selector 16 as shown in FIG. 4, together with electrical circuitry of the sort illustrated in FIG. 5 provides a means for rapidly and accurately selecting rings and spacers to give a desired tool holder indentification. Of course, other electrical circuits may be used, if desired. For example, electronic components can be substituted for many of the electromechanical arrangements shown.

The stack of coding rings and spacers 56 is lifted off of member 82 and slipped over a tool holder 36, after which retaining ring 52 is threaded into place. A corresponding tool 42 is inserted into collet 38 and plug 46 is adjusted to provide the desired tool extension, producing an assembled tool as seen in FIG. 2, ready for tool position checking and tightening of collet 38 to lock tool 42 in place.

Details of the torque head which secures the tool 42 in tool holder 36 are shown in FIGS. 6, 7 and 8. The torquing device 24 basically includes a cylindrical sleeve 134 and an outwardly extending flange 136. Sleeve 134 has a cylindrical bore 132 adapted to hold tool holder 36. Flange 136 is secured to the surface of desk 10; or, if desired to a stabilizing support column 138 (as seen in FIG. 1) which may extend through desk 10 from flange 136 to the floor. Bore 132, which continues down through the top of desk 10. If a support column 138 is provided, an opening (not shown) is provided just below the desk top at the front of column 138, so that the operator may reach into column 138 and rotates plug 46 within tool holder 36 with a screwdriver while the tool holder is mounted in the torque head. Thus, the extension of tool 42 may be adjusted while extension readings are being taken, as discussed in detail below. A setscrew 137 is brought into engagement with tool holder 36 so that the tool holder is not raised when plug 46 is adjusted with a screwdriver extended upwardly in bore 132.

A rotatable member 140 surrounds sleeve 134 and is mounted on bearings 142 and 144 for rotation relative thereto. An outwardly extending flange 146 on member 140 terminates in gear teeth which may engage a driven gear driven by any suitable conventional means, such as an electrical or air motor (not shown) mounted below the surface of desk 10.

Tool holder 36 rests in a horizontal slot 148 in the upper end of sleeve 134, which engages flats 37 on tool holder 36 (shown in FIG. 2) to hold tool holder 36 against rotation. Tool holder 36 can be secured in bore 132 by tightening setscrew 137.

Figure 9:
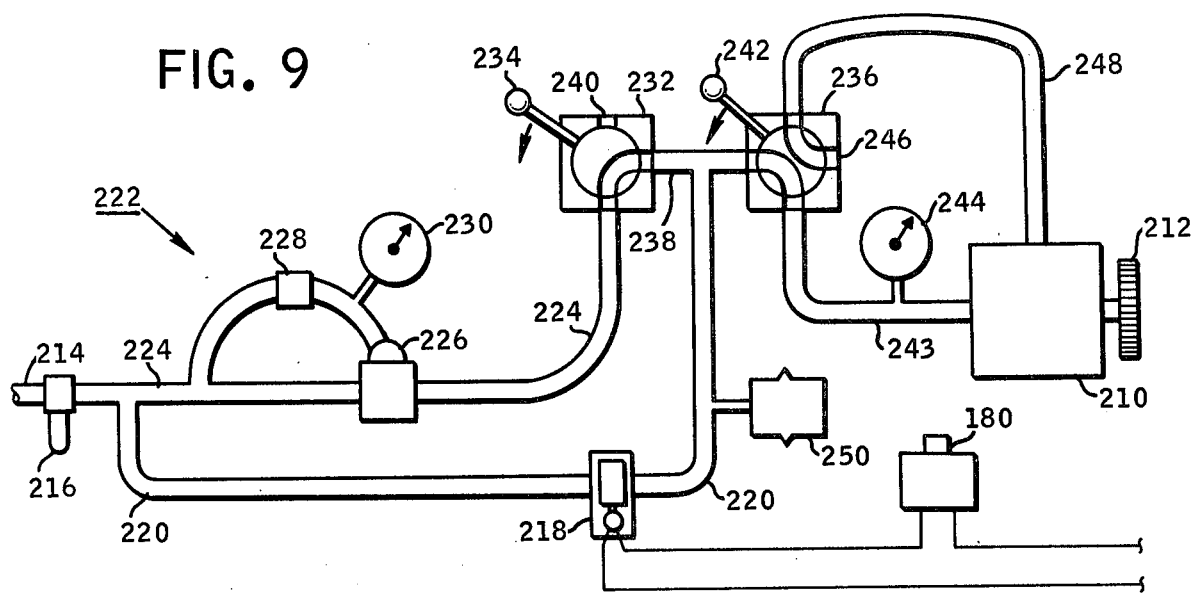
FIG. 9 is a simplified schematic diagram of the electro-pneumatic system which operates the torquing station.

A support member 150 is securely fastened to rotatable member 140, such as by cap screw 152 and pin 154. A T-slot 156 at the top of member 150 guides a wrench 158 for sliding movement toward and away from tool holder 36 within sleeve 134. To torque nut 44 to tighten collet 38 around tool 42, an operator slides wrench 158 inwardly to fully engage nut 44, then actuates the drive means to rotate rotatable member 140 by pressing button 180 on control panel 178 (FIG. 9). In a conventional manner, rotation is continued until nut 44 has been tightened to the desired torque loading.

A simplified electro-hydraulic schematic diagram illustrating the torque head operating arrangement, is shown in FIG. 9. This system uses an air motor 210 driving gear 146 through gear 212 (FIG. 1) to provide 0 to 150 foot-pounds torque at the torque head 24. Typical air motors include the Gardner-Denver Co. Series 70B4 air motors. Although air motors are preferred for simplicity and efficiency, an electric motor drive system could be used, if desired.

In the system shown in FIG. 9, shop air (or air from any source, such as a portable compressor) at a pressure of about 80 to 100 psi enters through line 214 and passes through filter 216 which removes dirt and moisture from the air. Line 214 divides, with air passing to solenoid valve 218 through line 220 and to a pressure regulator assembly 222 through line 224. Pressure regulator assembly 222 includes air dome regulator 226, preset regulator 228 and pressure gage 230. Preset regulator 228, typically a Grove Model 18 from Grove Valve and Regulator Co., presets the static load on air dome regulator 226, which may typically be a Grove Model GS400 or GH400 regulator. Pressure gage 230 measures the pressure in the dome of air dome regulator 226. This assembly 222, using the air dome loading principle, is preferred over spring types since it provides a universal control range without requiring mechanical spring adjustment and is more accurate.

Air at the selected maximum pressure passes from pressure regulator assembly 222 to a motor stop and air dump valve 232. With handle 234 in the position shown, air is directed to motor direction valve 236 through line 238. When handle 234 is moved downwardly as indicated by the arrow, air supply from line 224 is shut off and air in line 238 is dumped through exhaust 240.

With handle 242 of direction valve 236 in the position shown, air is directed to the forward drive connection of air motor 210 through line 243. An air pressure gage 244 can be calibrated in pounds torque, since the torque generated by air motor 210 is directly proportional to entering air pressure. To reverse air motor 210, handle 242 is moved downwardly as indicated by the arrow. Air in line 243 is dumped through exhaust 246 and air from line 238 is directed to the reverse connection of air motor 210 through line 248.

If it is necessary to provide greater torque than is provided by the pressure regulated line 224, additional pressure may be provided by pressing button 180 to open valve 218 to admit unregulated air through line 220 to valve 236. Ordinarily the button is quickly pressed, or "jogged" so that torque, as shown on gage 244, rises in small increments. A relief valve 250 is set to release below the pressure at which the air motor or other components might be damaged.

In use, a tool holder is placed in torque device 24 and wrench 158 is moved into engagement with nut 44. Valve handles 234 and 242 are moved to the upper, or forward drive, positions. Gear 212 (FIG. 1) is rotated by air motor 210, rotating geared flange 146 and wrench 158 (FIG. 6) to tighten nut 44. If additional torque is required, button 180 is jogged to slowly increase torque to the level desired, as indicated on gage 244. Valve handle 234 is moved to the lower or exhaust position, releasing the torque. Wrench 158 is retracted and the tool holder can be removed.

If an error was made in locating the tool 42 in tool holder 36 as indicated by vertical probe 26 or horizontal probe 28 (FIG. 1) or for any other reason, it may be desirable to remove nut 44. To do so, wrench 158 is again brought into engagement with nut 44, handle 234 is moved to the upper or operate position and handle 242 is moved to the lower or reverse position. Since the regulated air pressure is usually insufficient to break nut 44 loose, button 180 is ordinarily pressed and held down, admitting full pressure air to air motor 210, until nut 44 breaks loose. Button 180 is released and handle 234 is moved to the lower or exhaust position. Then, geared flange 146 can easily be rotated by hand during further removal of nut 44, readjustment of the tool position, etc.

Figure 10:
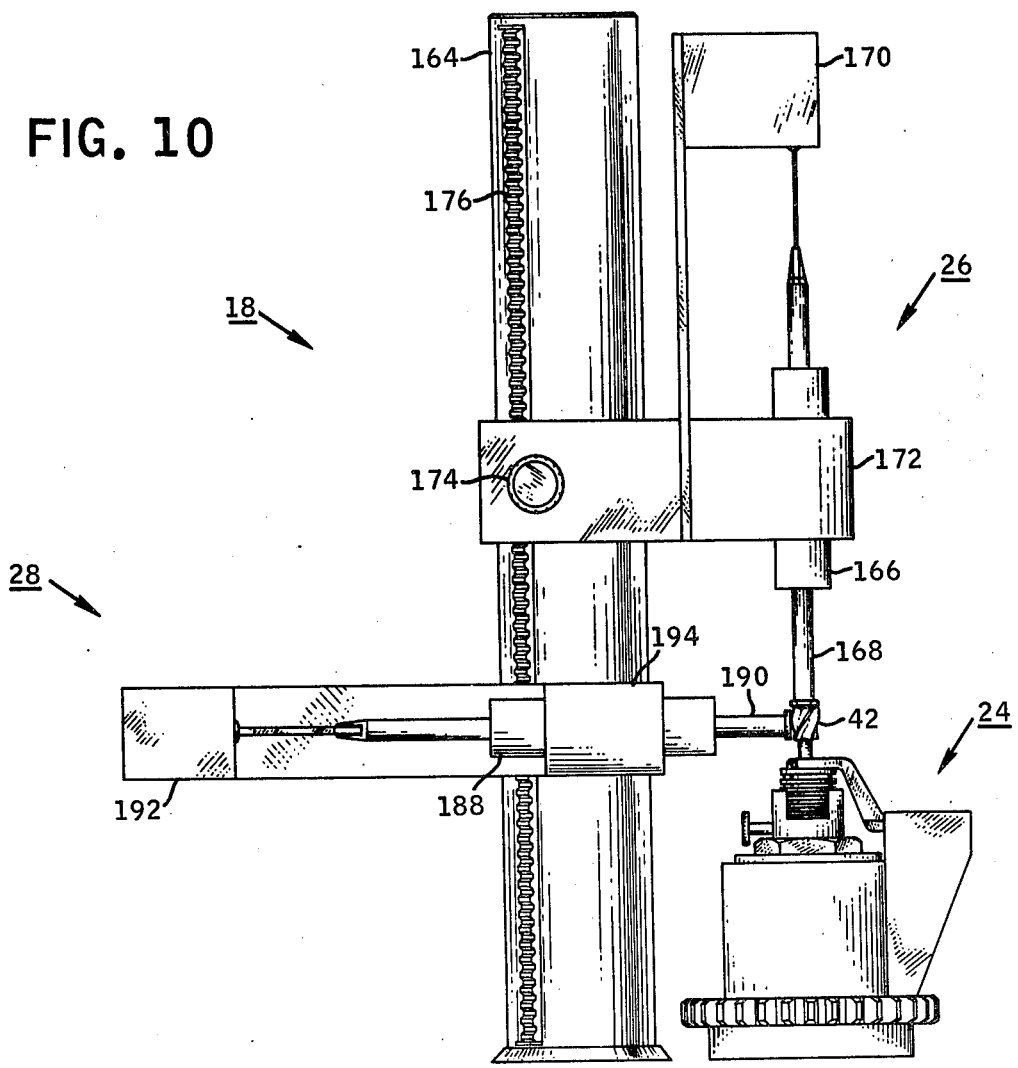
FIG. 10 is a vertical elevation view showing the tool inspection assembly.

While tool holder 36 is in the torquing device, the tool 42 can be checked for proper length and diameter. The inspection assembly, comprising vertical probe 26 and horizontal probe 28, is shown in FIGS. 1 and 10.

A column 164, mounted on desk 10 supports both vertical probe 26 and horizontal probe 28. If desired for greater stability, column 164 could extend through desk 10 to the floor, similarly to column 138. Vertical probe 26 includes a cylinder 166 within which measuring probe 168 is axially movable. Vertical probe 26 may be an hydraulic cylinder, lead screw or any other means allowing selective extension of measuring probe 168. Measurements are made by measuring means 170, such as a Kodar II measuring system from Ideal Aerosmith, Inc., which measures the extension of measuring probe 168. Vertical probe 26 is mounted on a carriage 172 which surrounds the upper portion of column 164 for movement therealong. Pinion gears (not shown) rotatable by knob 174 move carriage 172 along rack gear 176. Ordinarily, carriage 172 will be left in one position during measuring similar tools. When tools of greatly varying length are to be measured, carriage 172 is moved as necessary. Either an automatic compensation is made in measuring means 170 to compensate for carriage movement, or measuring means 170 is recalibrated.

Figure 11:
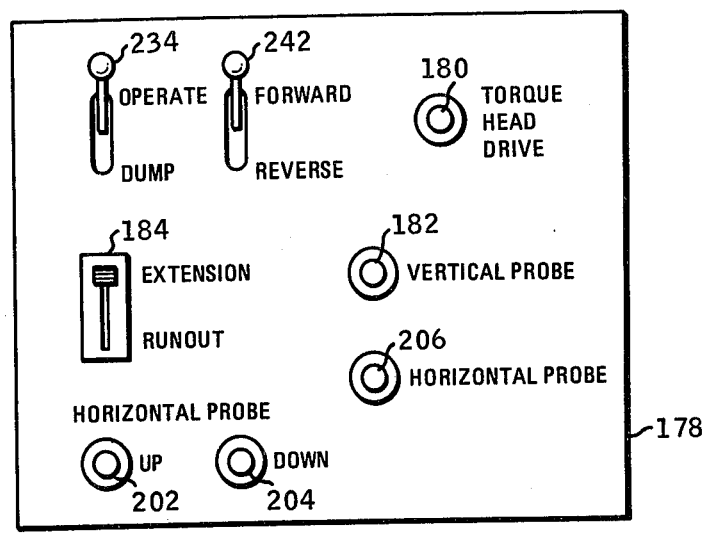
FIG. 11 is a plan view of the system control panel.

After the tool has been locked in the collet by operating torque head 24 (by pressing button 180 on the control panel 178, FIG. 11) the vertical dimension, or extension, of the tool is measured by pressing vertical probe button 182 (FIG. 10) with slide switch 184 in the upper or "extension" position. While button 182 is held down, probe 168 is extended and the extension measurement from measuring means 170 is displayed on display 30, which also shows the word "extension" as seen at 31 in FIG. 1. If desired, a conventional printer may also be actuated to produce a paper copy of the exterior readout.

Measurement of the horizontal dimension of tool 42, or runout, is obtained by a horizontal probe assembly 28, which includes an hydraulic or similar cylinder 188 housing an extendable measuring probe 190. A measuring means 192, such as another Kodar II Unit, measures the extension of probe 190 and sends a signal to display 30. Horizontal probe assembly 28 is mounted on a carriage 194 which surrounds column 164 for vertical movement therealong. Carriage 194 is moved by a motor (not shown) mounted on carriage 194, which may be a conventional air or electrical motor, which drives a pinion gear (not shown) engaging rack 176 secured to column 164. This reversible motor is operated by pressing either "up" button 202 or "down" button 204 on control panel 178 (FIG. 11) to position probe 190 at the desired location. The horizontal dimension, or runout, of tool 42 is measured at the selected location by pressing horizontal probe button 206 with slide switch 184 in the lower or "runout" position. Probe 190 extends into contact with tool 42 and measuring means 192 displays the runout on display 30 while the word "runout" is also displayed. Again, if desired, a conventional printer may be used to produce a hand copy readout. When button 206 is released, probe 190 retracts. If either extension or runout is out of tolerance, nut 44 is backed off, the position of tool 42 is adjusted, nut 44 is retightened and the measurements are repeated. Runout readings may be taken at several positions by withdrawing wrench 158 and manually rotating tool holder 36 while taking other horizontal readings.

When measurement of tool 42 runout and extension is completed, the tool holder 36 is removed from torque device 24 and moved to the ring counter 20. As seen in FIG. 1, ring counter 20 includes a housing having a ledge 280 upon which tool holder 36 may be placed as shown. On the front panel of ring counter are included an "on-off" switch 282 and a digital readout display 284. The portion of tool holder 36 carrying coding rings 56 fits within a ring sensor head 286 which is shown in greater detail in FIGS. 12 and 13.

Sensor head 286 includes a base plate 288 spaced from an upper plate 290 by a pair of blocks 292 and 294. Base plate 288 has a slot 296 sized to allow tool holder 36 to slide easily but snugly thereinto. Upper plate 290 is generally U-shaped to allow placement of tool holder 36 without hindrance. Each of blocks 292 and 294 has a plurality of holes through which pins 298 protrude. The pins are aligned with ring positions on tool holder 36, with block 292 matching the 1, 3, 5, 7 etc. ring positions and pins (hidden in FIG. 12) in block 294 matching the 2, 4, 6, 8, etc. ring positions. While all pins could be located in one block, this staggered arrangement is preferred because typical micro switches are considerably thicker than coding rings 56.

Figure 13:
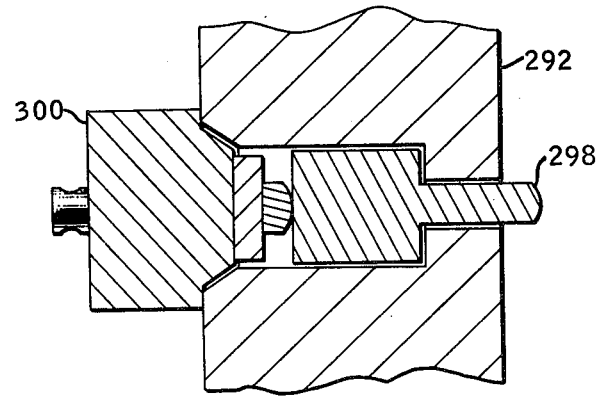
FIG. 13 is a partial sectional view taken through one switch assembly, on line 13—13 in FIG. 12.

Pins 298 are arranged to be slidable inwardly of the holes in the blocks. When a larger diameter ring 74 is at a selected location, the corresponding pin 288 will be pressed inwardly, while the pin will not be moved if a smaller diameter spacer ring 76 is at that location. As seen in FIG. 13, each pin 298 when moved inwardly operates a conventional microswitch 300. Microswitches 300 are held in place by long bolts 302 which pass through upper plate 290, microswitches 300, spacer blocks 304 into threaded holes in base plate 288. Similar bolts 306 secure blocks 292 and 294 to base plate 288 and upper plate 290.

Figure 14A:
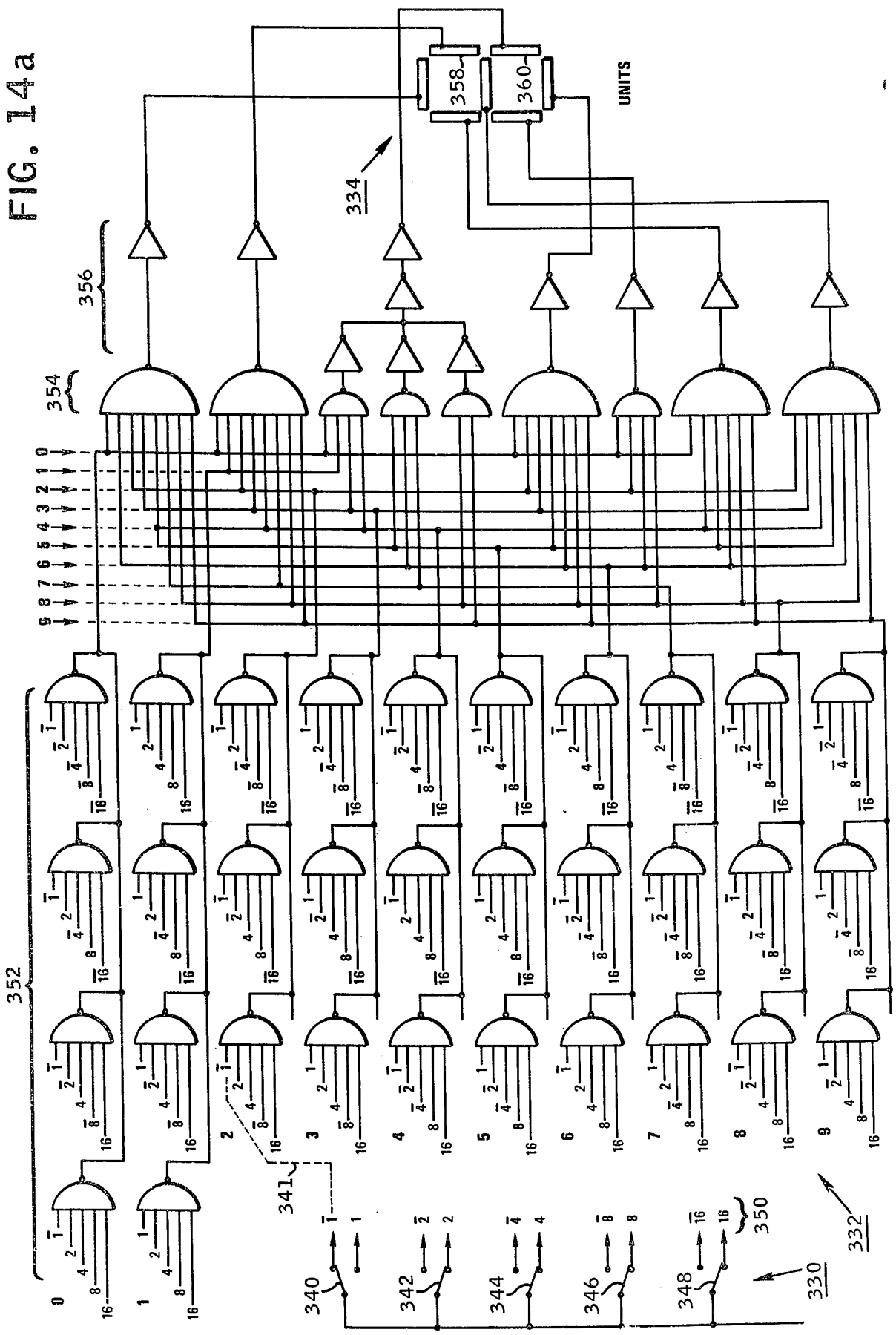
FIGS. 14a and 14b are simplified electrical schematic drawings showing the ring counter circuit.
Figure 14B:
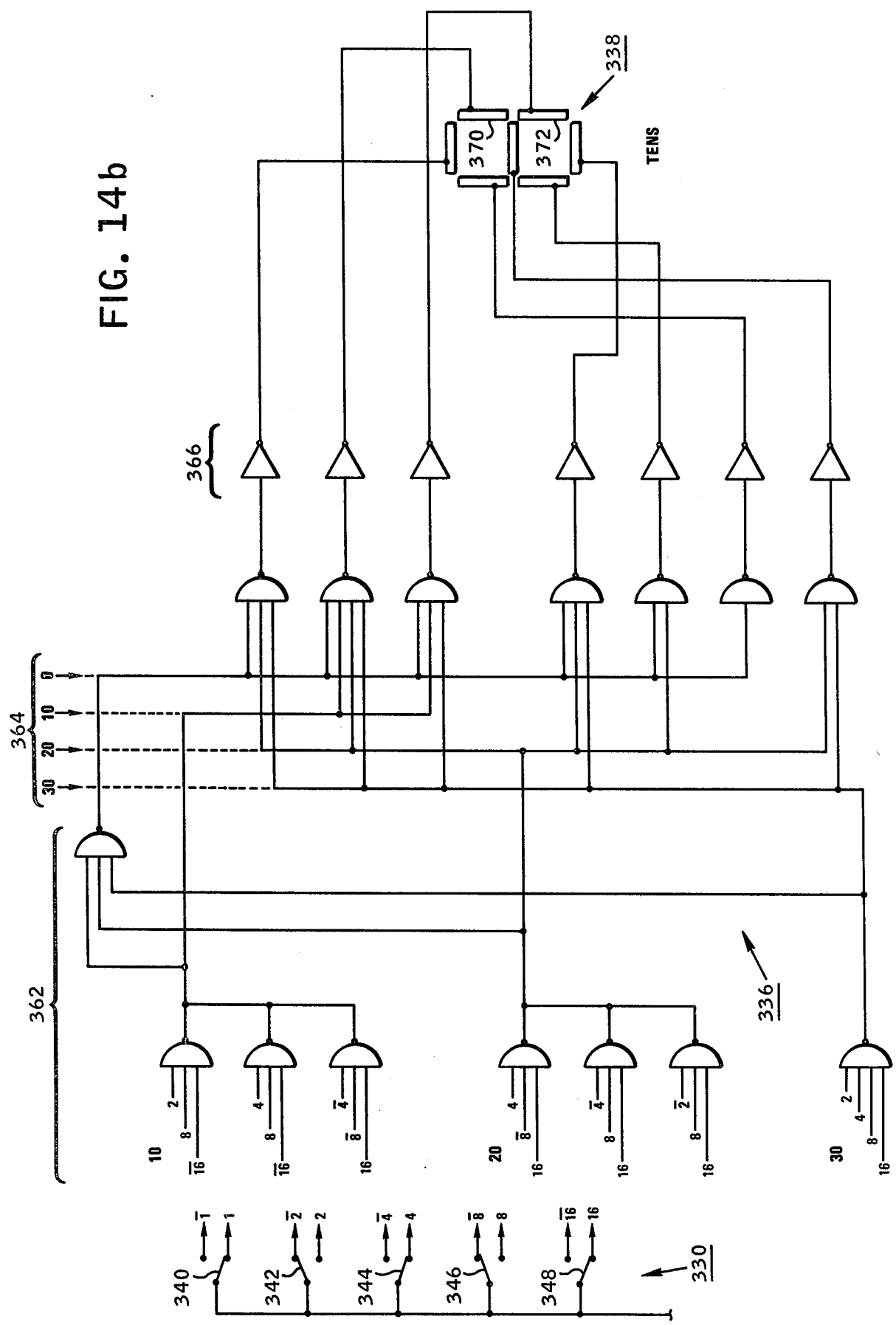

Depending upon which pins 298 are engaged by large diameter code rings 74, a pattern of switches 300 will be closed which will generate a signal producing a digital output at display 284 (FIG. 1). A typical circuit for accomplishing this is shown schematically in FIGS. 14(a) and 14(b). The circuits shown in FIGS. 14(a) and 14(b) include five of the ten switches, producing output on two of the four digital readout elements, the "units" and "tens" elements, making up display 284. FIG. 14(a) includes an illustration of the ring selector switch arrangement 330, nandgate assembly circuit 352 and the "units" digital readout element 334. FIG. 14(b) ring selector switch arrangement 330 (repeated for clarity) a nandgate assembly circuit 336 and the "tens" digital readout element 338. Similar circuitry, not shown for clarity continues in the same manner to operate the "units" and "tens" display elements for the other half of the ring and spacer coding assembly.

Figure 12:
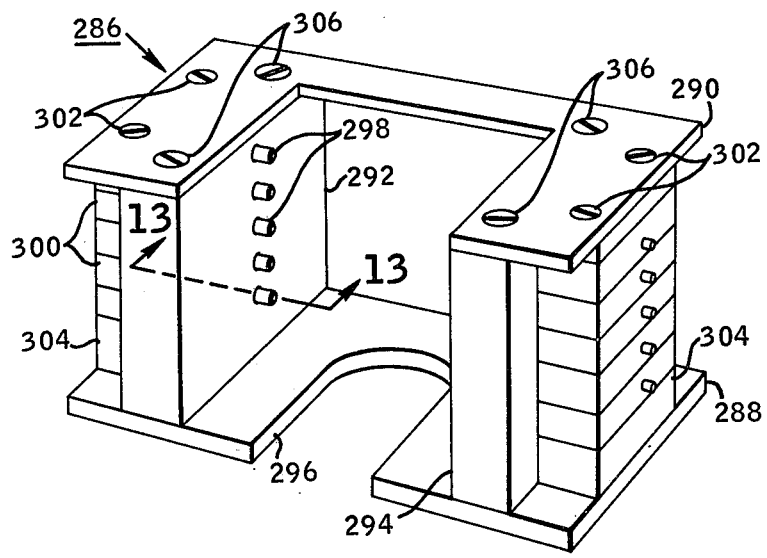
FIG. 12 is a perspective view of the ring decoder switch head used at the ring counter station.

Referring now to FIG. 14(a), the array of ring selector switches 330 which could, for example, be the top four switches 300 in FIG. 12 is seen with switch 340 closed by a ring 74 and switches 342, 344, and 346 remaining open due to the presence at the corresponding position in ring counter 20 of spacer 76 rather than rings 74. As indicated in the binary ring value column 350, for the example given, the signal from switch 340 is "$\overline{1}$" or low (grounded) while the signals from switches 342, 344, 346 and 348 are 2, 4, 8, and 16, respectively or all high (ungrounded).

In a conventional manner, conductors connect each of the switch outputs to the correspondingly coded inputs of the individual nandgates making up nandgate array 352. For example, a "low" signal will pass from the $\overline{1}$ output of switch 340 to the input of each nandgate 352 having an "$\overline{1}$" input. One of these conductors is schematically indicated at 341, illustrating a connection between the $\overline{1}$ contact of switch 340 and the $\overline{1}$ input of one of the members of nandgate array 352. Similarly, "high" signals will pass from the outputs 2, 4, 8 and 16 of the other switches to the corresponding inputs of nandgates 352. "Low" can be thought of as presence of an electrical signal while "high" is the absence of an electrical signal. Since each of nandgates 352 is an inverter, if *all* inputs to a nandgate are high, the nandgate output will be low, while if *any* of the parallel input signals is low, the nandgate output will be high.

Signals from the nandgate horizontal rows within array 352 are passed to nandgate array 354. Again, each of nandgates 354 acts as an inverter, so that if *all* of the input signals are high, the output will be low, while if *any* of the input signals are low, the output will be high.

The output signals from nandgate array 354 are inverted by inverter array 356 and conducted to digital readout element 334 in a conventional manner. Each "high" input into an inverter 356 will produce a "low" output, causing the corresponding bar elements of readout 334 to be illuminated. Thus in the present example, bars 358 and 360 will be illuminated, producing the "1" readout. The matrix of inputs to nandgates 352 are selected in a conventional manner so that the appropriate 2, 3 or more readout bars will be illuminated in the desired configuration. These may, of course be varied, depending upon the readout element configuration, number of bars, etc.

The "tens" display is operated in a similar manner, as illustrated in FIG. 13(b). In this case, for example, the second and fourth coding rings may have operated switches 342 and 346. The outputs of switches 340 through 348 are then 1 (high), $\overline{2}$ (low), 4 (high), $\overline{8}$ (low) and 16 (high). This produces a binary "10", which should appear in the digital readout elements 334 and 338. The output signals of each switch are conducted to the correspondingly coded inputs of all nandgates in nandgate array 352 (FIG. 13(a)) and 362 (FIG. 13(b)). Since the highest displayed number desired is less than 40, there are only nandgate groups in array 362 for 10, 20, and 30, as indicated in the drawing.

As discussed above, the nandgates in arrays 352 and 362 produce a low output signal when any of the parallel inputs is low. Thus, a "low" signal is produced by the nandgate rows for "0" (FIG. 14(a)) and "10" FIG. 14(b). The output signals from nandgate arrays 352 and 362 pass to nandgate arrays 354 and 364 where the signals are summed and inverted in the manner discussed above in conjunction with FIG. 14(a). The output passes to inverters 356 and 366, where the signal is inverted and directed to digital readout elements 334 and 338. "Low" signals from individual inverters in arrays 356 and 366 cause the corresponding bars of each readout to be illuminated. For the number "10", the outer ring of readout 334 is illuminated, and bars 370 and 372 of readout element 338 are illuminated.

While FIGS. 13(a) and 13(b), illustrate one decoding logic circuit, others, with other digital readout means, may be used if desired. As mentioned above, the other five decoding switches as seen in FIGS. 1 and 12, are connected to a circuit and readout means which duplicates that shown in FIGS. 13(a) and 13(b), so that all four digits are displayed.

If desired, a stack of coding rings produced at the first station may be installed on a tool holder and the coding sequence can be immediately checked at the third station prior to installation of a tool in the tool holder. While certain preferred arrangements and components are described in conjunction with the above description of a preferred embodiment, there may be varied and other components used, where suitable, with similar results. For example other electronic circuits may be substituted for those described where a similar function is performed.

Other applications, variations and ramifications of this invention will occur to those skilled in the art upon reading this disclosure. These are intended to be included within the scope of this invention, as defined in the appended claims.

I claim:

1. A tool assembly means which comprises:
   means for supporting a tool holder with a tool extending upwardly from said tool holder;
   a digital height gage for measuring the height or extension of said tool;
   a digital diameter gage for measuring the diameter or runout of said tool;
   electrical circuit means for producing a digital readout selectively corresponding to the reading of either of said gages;
   means permitting adjustment of said tool in said holder to vary tool position; and
   power torque means for tightening a locking means locking said tool in said tool at the adjusted position.

2. The tool assembly means according to claim 1 wherein said power torque means comprises:
   a fixed support means having slot walls engaging flats on said tool holder to prevent rotation of said tool holder relative to said fixed support;
   a rotatable member surrounding said fixed support;
   a wrench means mounted on said rotatable member adapted to engage a nut on a tool holding collet in said tool holder;
   drive means adapted to rotate said rotatable member selectively in either direction, whereby said nut is selectively tightened or loosened, locking or unlocking said collet and tool.

3. The tool assembly means according to claim 2 wherein said drive means comprises:
   an air motor with gear means engaging said rotatable member;
   pressure regulation means adapted to limit air motor air pressure to limit applied torque to a preselected torque level;
   valve means to selectively permit unregulated higher pressure air to enter said air motor whereby greater torque than said preselected torque level may be provided.

* * * * *

UNITED STATES PATENT AND TRADEMARK OFFICE
Certificate

Patent No. 4,151,642            Patented May 1, 1979

Charles L. Holland and Steven S. Hardy

Application having been made by Charles L. Holland and Steven S. Hardy, the inventors named in the patent above identified, and General Dynamics Corporation, San Diego, California, a corp. of Delaware, the assignee, for the issuance of a certificate under the provisions of Title 35, Section 256, of the United States Code, deleting the name of Steven S. Hardy as a joint inventor, and adding the name of John N. Coulson, Jr. as a joint inventor, and a showing and proof of facts satisfying the requirements of the said section having been submitted, it is this 3rd day of June 1980, certified that the name of the said Steven S. Hardy is hereby deleted from the said patent as a joint inventor, and certified that the name of John N. Coulson, Jr. is hereby added to the said patent as a joint inventor with the said Charles L. Holland.

FRED W. SHERLING,
*Associate Solicitor.*